(12) United States Patent
Senger

(10) Patent No.: US 9,651,100 B2
(45) Date of Patent: May 16, 2017

(54) CLUTCH ASSEMBLY WITH FRICTION PADS AND A CLUTCH CYLINDER

(71) Applicant: Anthony G. Senger, New Berlin, WI (US)

(72) Inventor: Anthony G. Senger, New Berlin, WI (US)

( * ) Notice: Subject to any disclaimer, the term of this patent is extended or adjusted under 35 U.S.C. 154(b) by 168 days.

(21) Appl. No.: 14/164,562

(22) Filed: Jan. 27, 2014

(65) Prior Publication Data

US 2015/0211582 A1  Jul. 30, 2015

(51) Int. Cl.
| | |
|---|---|
| F16D 41/24 | (2006.01) |
| F16D 41/06 | (2006.01) |
| F16D 13/14 | (2006.01) |
| F16D 41/063 | (2006.01) |

(52) U.S. Cl.
CPC ............. *F16D 41/24* (2013.01); *F16D 13/14* (2013.01); *F16D 41/063* (2013.01); *F16D 2041/0605* (2013.01); *F16D 2041/0606* (2013.01)

(58) Field of Classification Search
None
See application file for complete search history.

(56) References Cited

U.S. PATENT DOCUMENTS

| | | | | |
|---|---|---|---|---|
| 646,431 A | * | 4/1900 | Hauger | B62L 5/04 |
| | | | | 192/217.2 |
| 756,086 A | | 3/1904 | Weiler | |
| 761,577 A | * | 5/1904 | Bullis | B62L 5/04 |
| | | | | 192/217.3 |
| 951,880 A | * | 3/1910 | Fee | B62L 5/04 |
| | | | | 192/217.3 |
| 1,193,355 A | * | 8/1916 | Bullard | B62L 5/04 |
| | | | | 192/217.3 |
| 1,883,966 A | | 10/1932 | Krause | |
| 1,949,702 A | * | 3/1934 | Wennerstrom | F16D 41/063 |
| | | | | 192/41 R |
| 2,081,567 A | * | 5/1937 | Winkler | B62L 5/04 |
| | | | | 192/217.3 |
| 2,224,907 A | * | 12/1940 | Gee | B62L 5/12 |
| | | | | 192/14 |

(Continued)

FOREIGN PATENT DOCUMENTS

| | | |
|---|---|---|
| EP | 2020520 A1 | 2/2009 |
| WO | 2012000052 A1 | 1/2012 |

*Primary Examiner* — Colby M Hansen
(74) *Attorney, Agent, or Firm* — James Earl Lowe, Jr.

(57) ABSTRACT

A clutch assembly comprises a cylindrical driving member, a cylindrical driven member, coaxial with the cylindrical driving member, and a clutch cylinder between the driving member and the driven member and coaxial with the driving member and the driven member. The clutch assembly further includes a spring biasing the clutch cylinder towards the clutch cylinder. The clutch assembly also includes a plurality of friction pads, each one being attached to a different one of movable portions, and acting in response to movement of its movable portion, to cause frictional engagement between the driving member and the driven member, so that the driving member rotates the driven member. The clutch assembly also includes a U-shaped spring located in a slot in the driving member and compressible between the driving member and the clutch cylinder for rotationally biasing the clutch cylinder relative to the driving member in a clutch engagement direction.

18 Claims, 8 Drawing Sheets

(56) References Cited

U.S. PATENT DOCUMENTS

| | | | | |
|---|---|---|---|---|
| 2,764,270 A | * | 9/1956 | Goul | B62L 5/04 192/12 B |
| 2,799,183 A | | 7/1957 | Rhein | |
| 2,985,269 A | * | 5/1961 | Gleasman | B62L 5/16 192/217.3 |
| 3,972,573 A | * | 8/1976 | Marola | F16D 41/067 192/45.008 |
| 4,049,102 A | | 9/1977 | Hurst | |
| 4,281,749 A | | 8/1981 | Fogelberg | |
| 4,341,294 A | * | 7/1982 | Kerr | F16D 15/00 192/45.005 |
| 4,593,799 A | | 6/1986 | Ozaki | |
| 5,188,205 A | | 2/1993 | Karp | |
| 5,390,773 A | | 2/1995 | Proia | |
| 5,460,254 A | | 10/1995 | Huang | |
| 5,524,734 A | * | 6/1996 | Hanada | B62L 5/10 188/26 |
| 5,642,796 A | | 7/1997 | Tabe | |
| 5,662,197 A | | 9/1997 | Tabe | |
| 5,695,031 A | * | 12/1997 | Kurita | F16D 41/067 188/82.84 |
| 5,928,103 A | | 7/1999 | Shoge | |
| 5,961,424 A | | 10/1999 | Warner | |
| 6,013,005 A | | 1/2000 | Tabe | |
| 6,095,302 A | * | 8/2000 | Cheng | F16D 41/067 192/110 B |
| 6,155,394 A | | 12/2000 | Shook | |
| 6,644,452 B2 | | 11/2003 | Lew | |
| 6,971,467 B2 | | 12/2005 | Katsaros | |
| 7,156,196 B2 | | 1/2007 | Katsaros | |
| 7,488,275 B2 | | 2/2009 | Warner | |
| 7,938,241 B1 | | 5/2011 | Chen | |
| 7,938,242 B2 | | 5/2011 | Chen | |
| 8,312,976 B2 | | 11/2012 | French | |
| 8,403,123 B2 | | 3/2013 | Bird | |
| 8,448,767 B2 | | 5/2013 | Ando | |
| 2004/0063524 A1 | | 4/2004 | Zulawski | |
| 2005/0139443 A1 | | 6/2005 | Chen | |
| 2007/0089960 A1 | | 4/2007 | Kanehisa | |
| 2007/0187162 A1 | | 8/2007 | Katsaros | |
| 2007/0240960 A1 | | 10/2007 | French | |
| 2010/0122886 A1 | | 5/2010 | Chen | |
| 2010/0155188 A1 | | 6/2010 | Brees | |
| 2010/0224458 A1 | | 9/2010 | Shook | |
| 2011/0061490 A1 | | 3/2011 | Chen | |
| 2012/0318632 A1 | | 12/2012 | Blake | |
| 2013/0037369 A1 | | 2/2013 | Seol | |

\* cited by examiner

CLUTCH ASSEMBLY WITH FRICTION PADS AND A CLUTCH CYLINDER

BACKGROUND

The present disclosure is directed to a clutch assembly and, more particularly, to a noiseless one-way clutch assembly, also known as a freewheel.

Clutch assemblies have various uses. One common form of a clutch assembly is as a bicycle hub. More particularly, the hub of the drive-side wheel (usually the rear wheel) of a bicycle is sometimes provided with an integrated or separate clutch assembly referred to as a freewheel. The freewheel is usually equipped with a one-way clutch mechanism so that only unidirectional rotational force is transmitted to the bicycle wheel. One-way clutch mechanisms having various structures are known. One known example is a ratchet mechanism in which engagement between pawls and ratchet teeth is employed. When pedals drive a chain and the chain rotatably drives a cog, the ratchet mechanism transmits the torque from the ratchet teeth to the pawls and rotatably drives an inner component. The pawls are actuated by pawl springs in such a way as to ensure constant engagement with the ratchet teeth. The ratchet mechanism must possess extremely high strength and shock resistance because considerable torque and impact forces are transmitted from the ratchet teeth to the pawls.

When the pedals are stopped or rotated backward, the inner component of the freewheel rotates together with the wheel, creating a rotational movement in relation to the ratchet teeth. Because the inner component has pawls, the pawls and the ratchet teeth move relative to each other. Since the pawls are constantly actuated and pressed against the tooth surfaces of the ratchet teeth by pawl springs, the pawls chatter against the teeth surfaces of the ratchet teeth when performing a rocking movement in conformity with the peaks and valleys of the ratchet teeth. The noise generated by such a ratchet mechanism is unpleasant for the cyclist, and the friction between the pawls and the tooth surfaces of the ratchet teeth wastes energy. The result is that this type of friction wears out the pawls and the tooth surfaces of the ratchet teeth, thus shortening the life of the freewheel.

Other freewheel mechanisms have been employed, offering noiseless operation. In nearly all instances, however, added materials (and mass) have been used to control the relative position of the pawl by the provision of a separate mechanism responsive to the direction of the movement of the driving member. This adds to the complexity and cost of the freewheel. Other known clutch mechanisms that offer noiseless operation are roller or sprag clutches. In these systems, the operation is noiseless but the clutch components remain in constant contact, even when disengaged, resulting in systems that produce high friction and wear.

SUMMARY

An object of this disclosure is to provide a one-way clutch that can provide a noiseless one-way mechanism, with less complexity, and greater serviceability.

This disclosure provides a clutch assembly comprising a cylindrical driving member, and cylindrical driven member, coaxial with the cylindrical driving member. The clutch assembly also includes means for causing the driving member to engage the driven member in response to movement of the driving member in one direction relative to the driven member, and to disengage the driven member in response to movement of the driving member in an opposite direction relative to the driven member.

In one embodiment, the engaging causing means includes a friction pad between the driving member and the driven member.

This disclosure also provides such a clutch assembly including a clutch cylinder between the driving member and the driven member and coaxial with the driving member and the driven member, with at least a portion of the clutch cylinder being radially movable between a driven member engaging position and a driven member disengaging position. The clutch assembly also includes means biasing the clutch cylinder portion towards the clutch cylinder central axis, and means for causing the clutch cylinder portion to engage the driven member in response to movement of the driving member in one direction relative to the driven member, and to disengage the driven member in response to movement of the driving member in an opposite direction relative to the driven member.

This disclosure also provides such a clutch assembly comprising a cylindrical driving member including, on the circumference thereof, a plurality of spaced apart indentations, each having a cam profile. The clutch assembly also includes a cylindrical driven member, coaxial with the cylindrical driving member, and means received in the indentations between the driving member and the cylindrical driven member, responsive to rotation of the driving member, for engaging the driven member in response to rotation of the driving member in one direction relative to the driven member, and to disengage the driven member in response to rotation of the driving in an opposite direction relative to the driven member.

Figure 1:
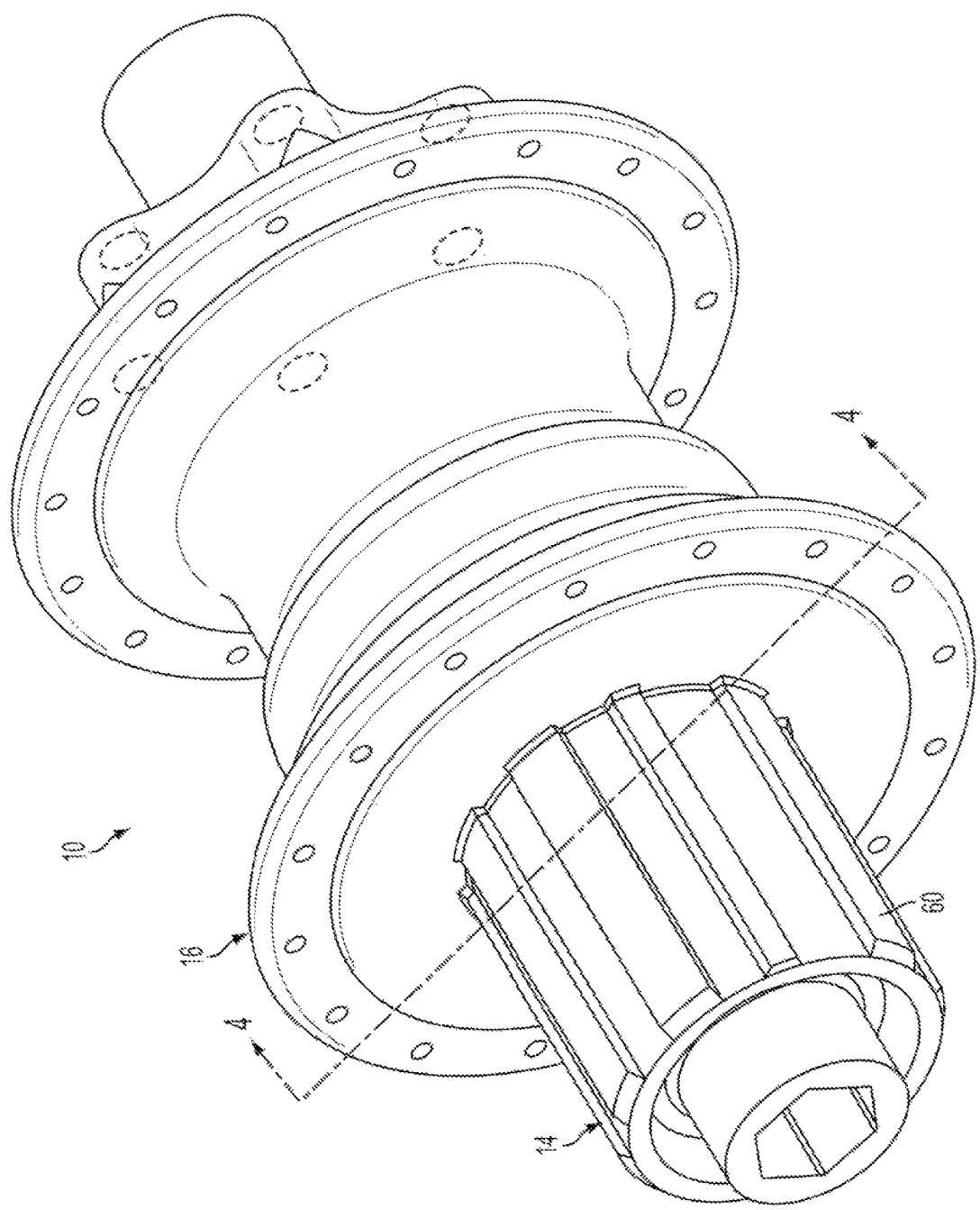
FIG. 1 is a perspective view of a hub assembly according to this disclosure.

Before one embodiment of the disclosure is explained in detail, it is to be understood that the disclosure is not limited in its application to the details of the construction and the arrangements of components set forth in the following description or illustrated in the drawings. The disclosure is capable of other embodiments and of being practiced or being carried out in various ways. Also, it is to be understood that the phraseology and terminology used herein is for the purpose of description and should not be regarded as limiting. Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Further, it is to be understood that such terms as "forward", "rearward", "left", "right", "upward", "downward", "side", "top" and "bottom", etc., are words of convenience and are not to be construed as limiting terms.

DESCRIPTION OF THE EMBODIMENTS

FIGS. 1 to 5 illustrate one embodiment of a clutch assembly 10 according to this disclosure. More particularly, the drawings illustrate a bicycle hub. In other embodiments, the clutch assembly can be used between any driving member and a driven member. For example, the clutch assembly can be used as a one way driving force for a drive shaft on machinery: such as a PTO for farm equipment, in the driving mechanism for a conveyor, on starter motors for internal combustion engines, to link two drive systems in series like in a hybrid car application, on helicopters to link the powertrain to the main rotor and allow for a failsafe whereby the rotor can continue to rotate in one direction even if the driveline stops, or in automotive automatic transmissions to allow for smoother shifts between gears without producing transmission feedback into the engine.

In the illustrated embodiment, the clutch assembly 10 comprises a cylindrical driving member 14, a cylindrical driven member 16, coaxial with the cylindrical driving member 14, and means for causing the driving member 14 to engage the driven member 16 in response to rotation of the driving member 14 in one direction relative to the driven member 16, and to disengage the driven member 16 in response to rotation of the driving member 14 in an opposite direction relative to the driven member 16.

Figure 5:
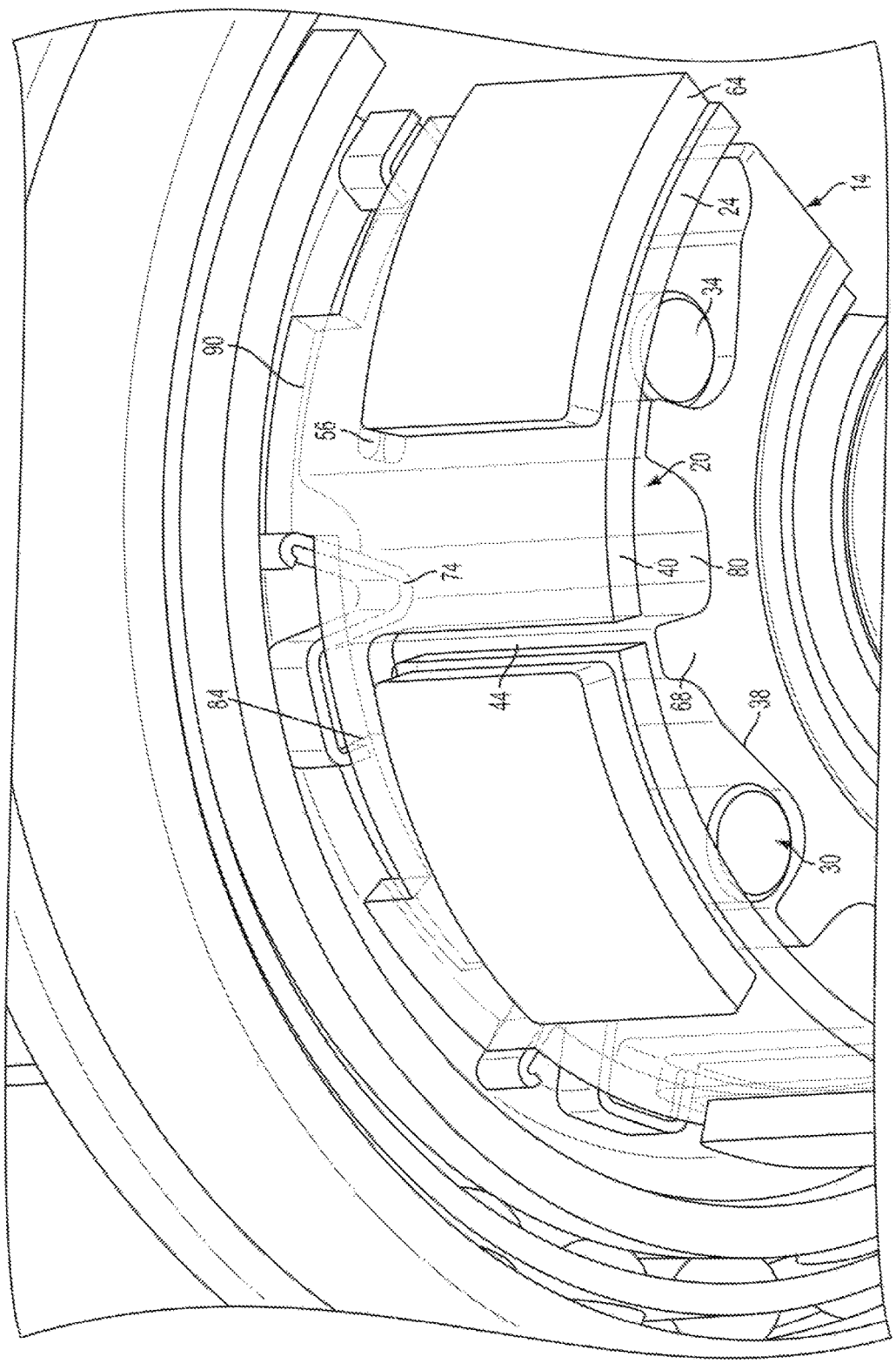
FIG. 5 is a perspective-enlarged view of a portion of the hub assembly of FIG. 1, with the driven member removed.
Figure 6:
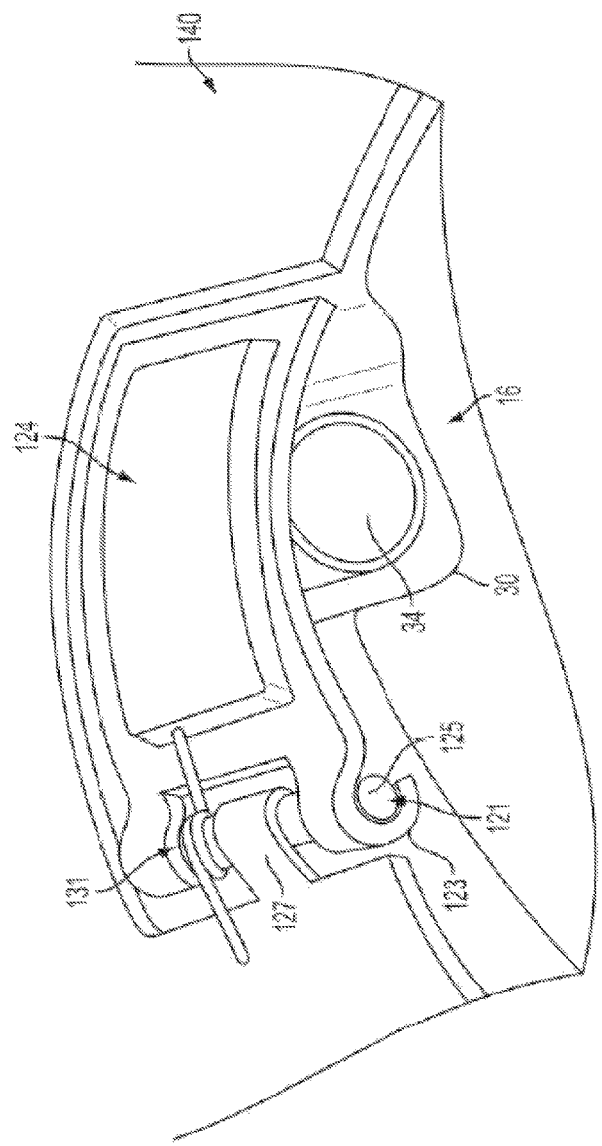
FIG. 6 is a perspective view of an alternate embodiment of the clutch assembly, with a hinged pivotable member.
Figure 7A:
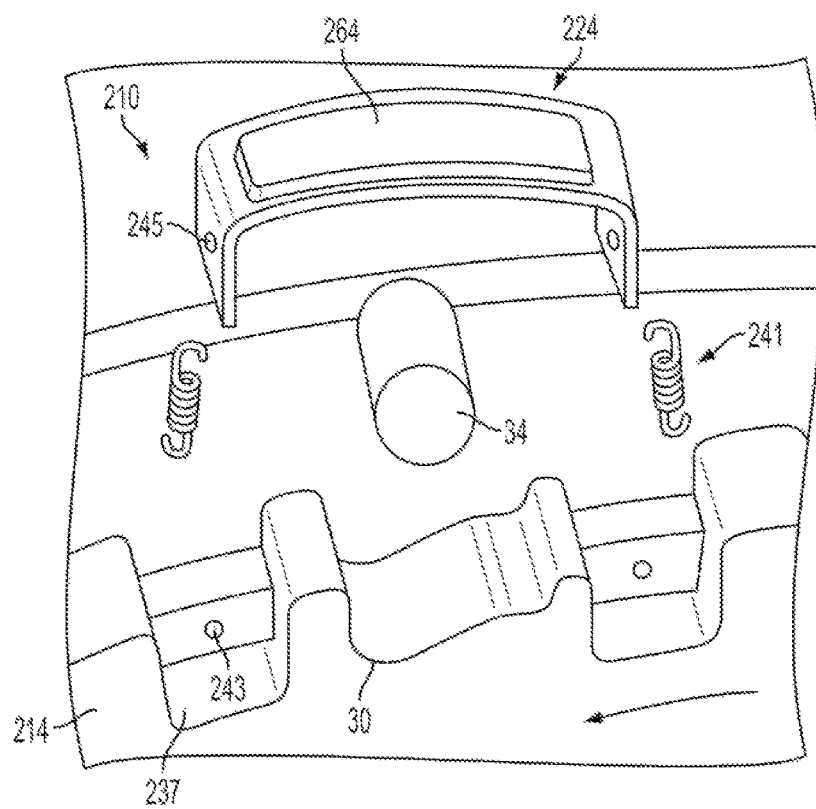
FIG. 7A is an exploded perspective view of another alternate embodiment of the clutch assembly.
Figure 7B:
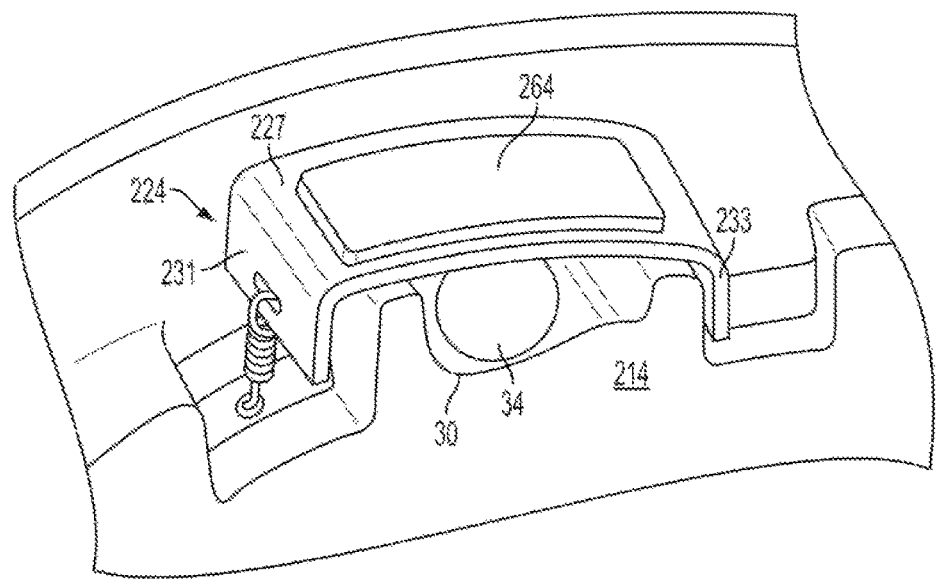
FIG. 7B is an assembled perspective side view of the embodiment shown in FIG. 7A.
Figure 8A:
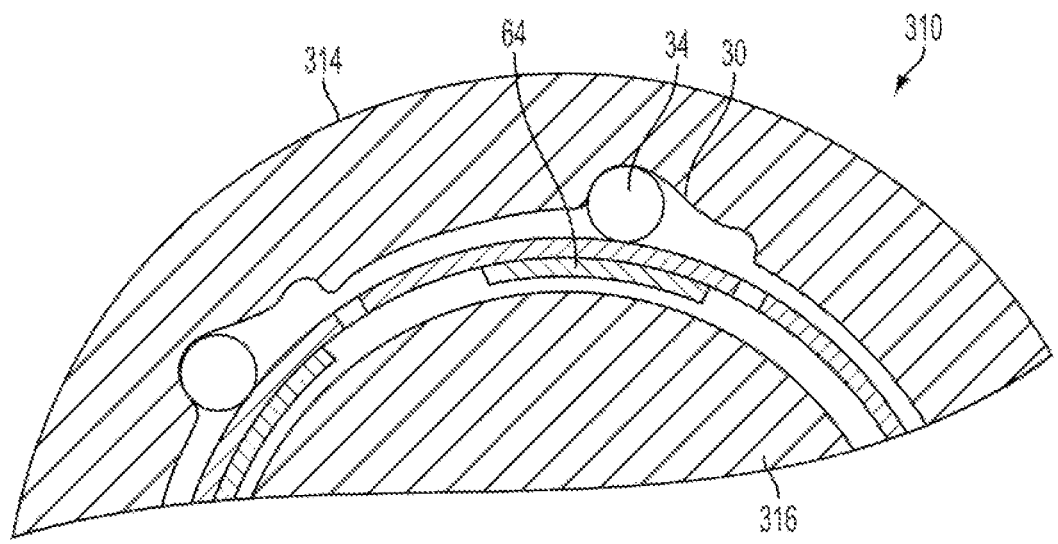
FIG. 8A is a side cross-sectional view of another alternate embodiment of the clutch assembly. In this embodiment, the driving member is on the outside of the assembly, and the driven member is on the inside of the assembly. In this Figure, the pin or cam follower is shown in a position where the driving member is not engaging the driven member.

In the illustrated embodiment, the clutch assembly also includes a clutch cylinder 20 between the driving member 14 and the driven member 16 and coaxial with the driving member 14 and the driven member 16. As more particularly described below, at least a portion 24 (see FIGS. 3, 4 and 5) of the clutch cylinder 20 is radially movable between a driven member engaging position, as shown in an alternate embodiment in FIG. 8B, and a driven member disengaging position, as shown in FIG. 8A. The clutch assembly 10 also includes means for biasing the clutch cylinder portion 24 towards the clutch cylinder central axis, as further described below. In the embodiment of FIGS. 1 to 6, the clutch cylinder 20 is a solid cylinder, but in other embodiments, such as shown in FIGS. 7A and 7B, the clutch can be formed in segments.

The driving member 14 includes, on the circumference thereof, an indentation 30 adjacent to the clutch cylinder portion 24. More particularly, there is a plurality of spaced apart indentations 30 around the circumference of the driving member 14. And the clutch assembly 10 further includes means for causing the clutch cylinder portion 24 to engage the driven member 16 in response to movement of the driving member 14 in one direction relative to the driven member 16, and to disengage the driven member 16 in response to movement of the driving member 14 in an opposite direction relative to the driven member 16. In the illustrated embodiment, the indentations 30 are integrally formed with the driving member 14, but in other less preferred embodiments, a separate piece (not shown) can be attached to and become a part of the driving number 14, in order to provide the indentation.

More particularly, the engaging causing means described above is in the form of means received in the indentations 30 between the driving member 14 and the clutch cylinder 20, responsive to rotation of the driving member 14, for moving the clutch cylinder 20 into and out of engagement with the driven member 16, and for engaging the driving member 14, as further explained below. Still more particularly, in the illustrated embodiment, the engaging causing means is in the form of a cam follower or roller or pin 34, with the indentation 30 having a cam or ramp profile 38 (see FIGS. 4 and 5).

More particularly, in the illustrated embodiment, the cam profile 38 is such that, in response to the rotation of the driving member 14 in one direction, the pin 34 rolls along the cam profile 38 and radially outwardly, and in response to rotation of the driving member 14 in the opposite direction, the pin 34 rolls along the cam profile 38 in the opposite direction, and radially inwardly. This movement of the pin 34 either radially inward or outward causes a comparable movement of the pivotable portion 24.

In other embodiments, a ball (not shown) can be used. In still other less preferred embodiments, a standing or reclining elongated sprag type member (not shown), standing or reclining depending on its frictional engagement between the driving member and the clutch cylinder and its direction of movement, can be used.

In the illustrated embodiment, the portion 24 of the clutch cylinder 20, radially movable between a driven member engaging position and a driven member disengaging position, is a plurality of spaced apart pivotable portions attached to a cylindrical base 40. In other embodiments, such as shown in FIGS. 7A and 7B described below, the portions may be movable, but not pivotable.

In the illustrated embodiment, the means for biasing the pivotable portions 24 towards the clutch cylinder central axis is provided by having the spaced apart pivotable portions pivotable by being flexibly attached to the cylindrical base 40, similar to a leaf spring. As illustrated in FIG. 5, the pivotable portion 24 is created by a cut 44, made in the cylindrical base 40 from one end 48 (see FIG. 2) of the cylindrical base toward the other end 52 of the cylindrical base, almost through the cylindrical base 40, and then turning a cut 56 perpendicularly to a point where it forms such a length of a pivotable portion 24 that is coextensive with its adjacent indentation 30, as shown in FIG. 5.

In this embodiment, the means biasing the pivotable portions 24 towards the clutch cylinder central axis is the flexible attachment of the pivotable portions to the cylindrical base. In other embodiments, such as shown in FIG. 6, described below, the pivotable portion can be attached to the cylindrical base by a pivot joint, and the means for biasing the pivotable portion towards the clutch cylinder central access can be a tension spring attached between the pivotable portion and the driving member, or between the pivotable portion and the cylindrical base. In still other embodiments (not shown), the movable portion and the driving member can be biased toward each other by magnetism, such as by having a magnet mounted on the driven member, and a magnetic substance mounted on the movable portion.

Figure 2:
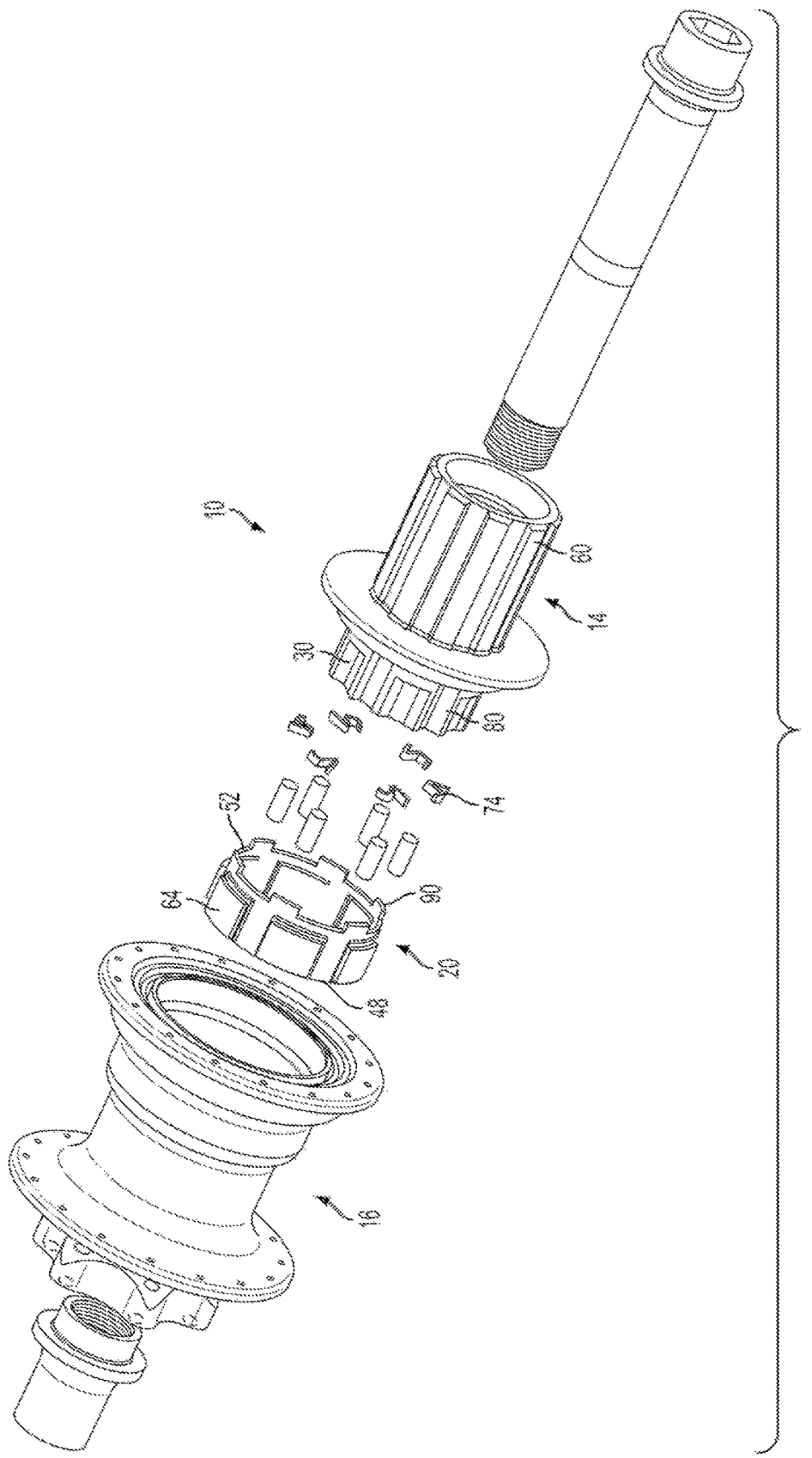
FIG. 2 is an exploded perspective view of the hub assembly shown in FIG. 1.
Figure 3:
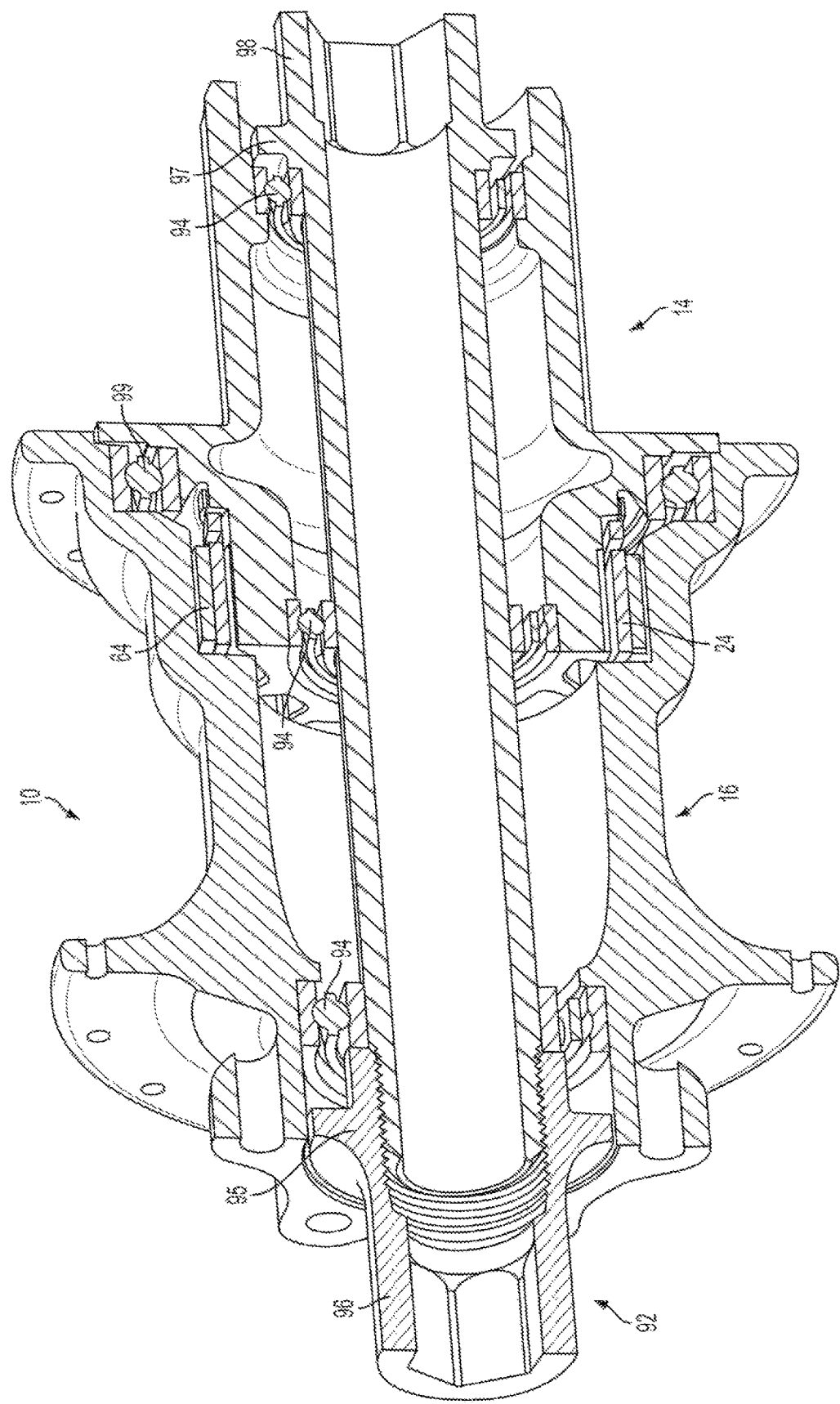
FIG. 3 is a cross-sectional side view of the hub assembly of FIG. 1.
Figure 4:
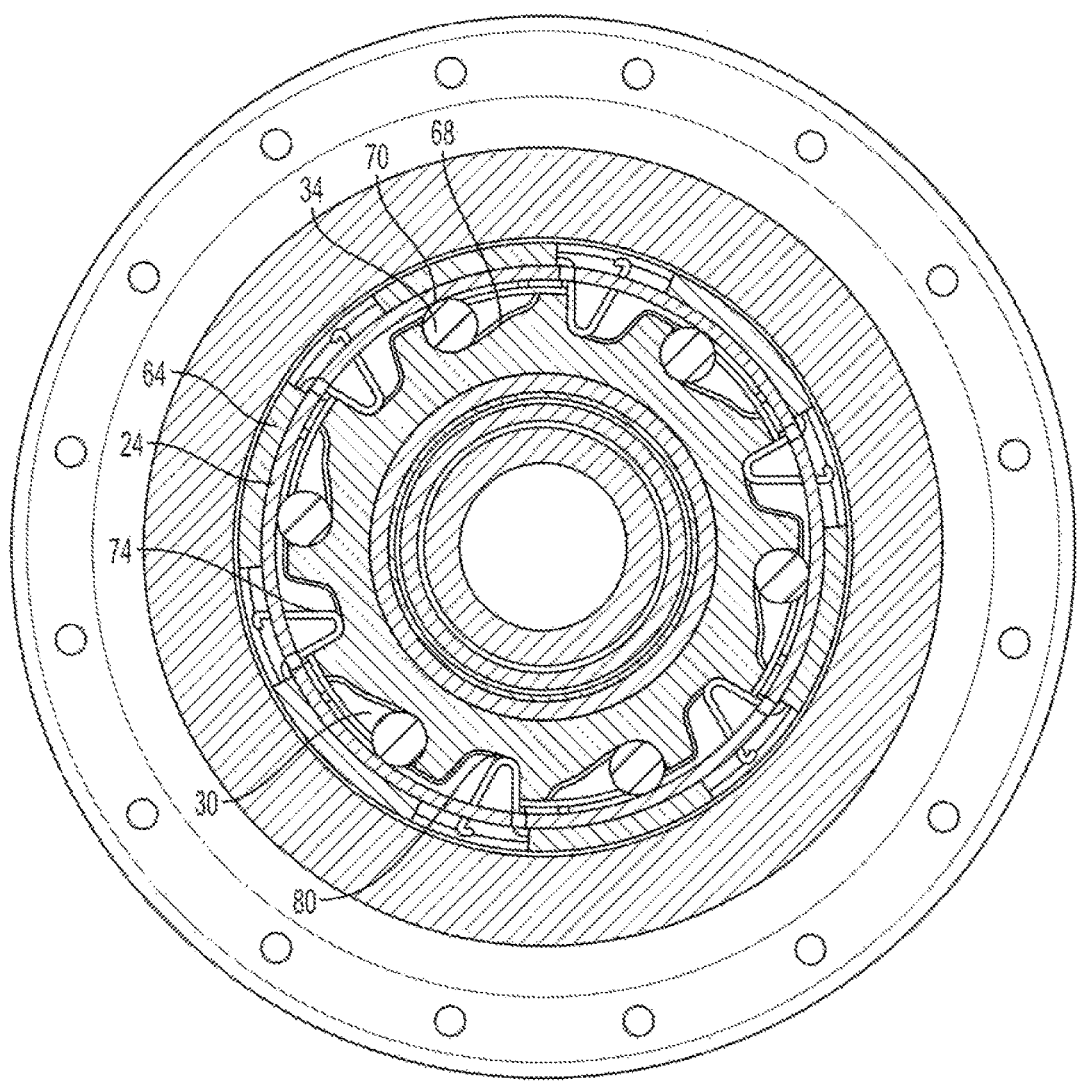
FIG. 4 is a cross-sectional view taken along the line 4-4 in FIG. 1.

In the illustrated embodiment, each indentation 30 is adjacent to a different one of the pivotable portions 24. As shown in FIGS. 1 and 2, the indentations 30 are on one end of the driving member 14, and a plurality of spaced apart teeth 60 is provided on the other end of the driving member 14. The teeth 60 provide a means for rotating the driving member 14, such as by a chain (not shown) engaging the driving member teeth 60. Bicycle pedals can drive the chain, for example. A wheel (not shown) can be mounted on the driven member 16.

More particularly, the teeth 60 form a spline to which a cassette of cogs can be slid onto which then allow a chain to drive the freewheel. The type of spline is determined by the brand or type of cassette you will use. The system can also support belt wheels (not shown) or other types of drive line/power transfer mechanisms, such as belt pulleys (not shown). The system can also employ gears (not shown) or have the gears or features machined into it. In other embodiments (not shown), means other than the teeth can be used, such as by providing a non-circular shape in the other end of the driving member 14.

In the illustrated embodiment, the means for causing the pivotable portion 24 to engage the driven member 16 in response to pivoting of the pivotable portion 24 in one direction relative to the driven member 16, and to disengage the driven member 16 in response to pivoting of the pivotable portion 24 in an opposite direction relative to the driven member 16, is in the form of a plurality of friction pads 64, each of which is attached to a different respective one of the pivotable portions 24. The pin's radially outward movement and engagement with the pivotable portion 24 in turn causes solid engagement through the respective friction pad 64 between the pivotable portion 24 and the driving member 14, so that rotation of the driving member 14 causes rotation of the driven member 16.

In the preferred embodiment, the friction material is shown as a rectangular shaped pad approximately 3 mm thick made from an organic brake pad type material. In other embodiments (not shown) the friction material can be a different shape or thickness (such as a coating), and have a different chemical composition. In other less preferred embodiments, in lieu of the friction pad, teeth (not shown) on the pivotable portion can engage corresponding teeth (not shown) on the driven member, in order to cause engagement between the clutch cylinder-moving portion and the driven member. Or, in lieu of the friction pad, in another less preferred embodiment, the end of the pivotal portion can engage a notch (not shown) in the driven member.

And when the driving member 14 is rotated in the opposite direction, the pin 34 moves radially inwardly along the cam profile 38, and the spring bias in the pivotable portion 24 moves the pivotable portion 24 radially inwardly. This in turn causes its respective friction pad 64 to no longer engage the driven member 16, thus permitting rotation of the driving member 14 relative to the driven member 16, without any contact between the driving member 14 and the driven member 16.

The friction pads 64 provide substantial benefits over the mechanical forms of engagement found in existing freewheel clutches. For example, when two steel parts come together in order to cause engagement between the driving member and the driven member, noise is created by the engagement of the parts. But when a friction pad 64 is the mechanism for causing engagement between the driving member and the driven member, the amount of noise associated with the engagement is significantly reduced. The friction pad 64 also permits a limited amount of slip to initially occur as the two members begin to engage. This results in a smoother transition of the clutch from the unengaged position to the engaged position.

The contact point 70 (see FIG. 4) between the pivotable portion 24 and the pin 34 produces a force vector that is not perfectly radially aligned with the driving member central axis. As a result, there is a small force component on the pin 34 that resists the initial movement of the pin 34 in response to rotation of the driving member 14. In order to counteract this, to permit prompt rolling of the pin 34 in response to rotation of the driven member 14, the clutch assembly 10 further includes means for rotationally biasing the clutch cylinder 20 relative to the driving member 14 in a clutch engagement direction, thus providing a small force component counter to that produced by the pivotable portion 24. More particularly, in the illustrated embodiment, a U-shaped spring 74 is placed in a slot 80 in the driving member 14 in a position between a wall 84 of the driving member 14 and a tab 90 that extends from one end of the cylindrical base 40 (see FIG. 5).

More particularly, there is a plurality of spaced apart slots 80, a plurality of spaced apart tabs 90, and a plurality of springs 74 received in respective slots 80. In other words, the springs 74 together provide an initial loading on the clutch cylinder 20 that counteracts the non-radial force applied to the pin 34 by the pivotable portion 24. In other embodiments (not shown), other biasing means can be used, such as tension springs or magnets.

The sizing of the bias spring force allows for a tuning of the system so that the force needed to induce motion in the pin can be reduced to a desired level. It helps the mechanism by allowing for adjustment of the sensitivity of transitioning from static to dynamic motion when force is applied to the driven member. But in other less preferred embodiments, this added means for rotationally biasing the clutch cylinder relative to the driving member in a clutch engagement direction can be eliminated.

The clutch assembly 10 also includes means for connecting the clutch cylinder 20 to the driving member 14. In the illustrated embodiment, this is in the form of the tabs 90 received in the slots 80. The tabs permit some relative movement between the clutch cylinder 20 and the driving member 14, as is desirable, as described below. But after some relative movement, the tabs 90 engage the driving member 14 and the driving member 14 drives the clutch cylinder 20. In other embodiments, such as shown in FIGS. 7A and 7B, other means can be used.

The clutch assembly 10 further includes a clutch assembly-mounting axle 92 (see FIG. 3) extending along the central axis of the driving member 14, and means rotatably mounting the axle inside the driving member and the driven member in the form of bearings 94. The axle 92 comprises a first portion 96 and a second portion 98 threadably engaging the first portion 96, in order to aid in the assembly of the clutch 10. Further, each of the axle portions includes a radially extending flange 95 and 97, respectively, for sealing the ends and thus the inside of the clutch assembly 10. There is also means for rotatably mounting the driving member inside the driven member, in the form of a bearing 99.

FIG. 6 is a perspective view of an alternate embodiment of the clutch assembly 110, with a hinged pivotable portion 124. In this embodiment, the same items have the same part numbering as in the earlier embodiment. In this embodiment, the pivotable portion 124 is hinged to the clutch cylinder base 140, by a hinged end 121 that includes two spaced apart curved ears 123 that engage a hinge pin 125, the hinge pin 125 being connected by an extension 127 to the clutch cylinder 120. The pivotable portion 124 is biased towards the driving member 14 by a coil spring 131 that engages the clutch cylinder base 140 and the pivotable portion 124. The coil spring 131 is received on the hinge pin 125.

FIG. 7A is an exploded perspective view of another alternate embodiment of the clutch assembly 210, and FIG. 7B is a perspective side view of the embodiment shown in FIG. 7A. In this embodiment, the same items have the same part numbering as in the first embodiment.

In this embodiment, the portion of the clutch cylinder radially movable between a driven member engaging position, and a driven member disengaging position, is a clutch segment 224 including a flat portion 227 with a first curved end 231 and a second curved end 233, the segment 224 forming a U-shape. Each end of the segment 224 is received within a respective spaced apart slot 237 in the driving member 214, each slot 237 being at and spaced apart from each end of the indentation 30. Each slot 237 is of a sufficient size to allow for some relatively movement between the clutch segment 224 and the driving member 214, for the reasons described below. Each end of the clutch segment 224 is biased towards the driving member 214 by a coil spring 241 connected between the end of the clutch segment 224 and the driving member 214. One end of the spring 241 is attached to the driving member at an opening 243 in the driving member, and the other end of the spring is attached to the clutch segment at an opening 245 in the clutch segment end.

FIG. 8A is a side cross-sectional view of another alternate embodiment 310 of the clutch assembly. In this embodiment, the driving member 314 is on the outside of the assembly, and the driven member 316 is on the inside of the assembly. In FIG. 8A, the pin or cam follower 334 is shown in a position where the driving member 314 is not engaging the driven member 316.

Figure 8B:
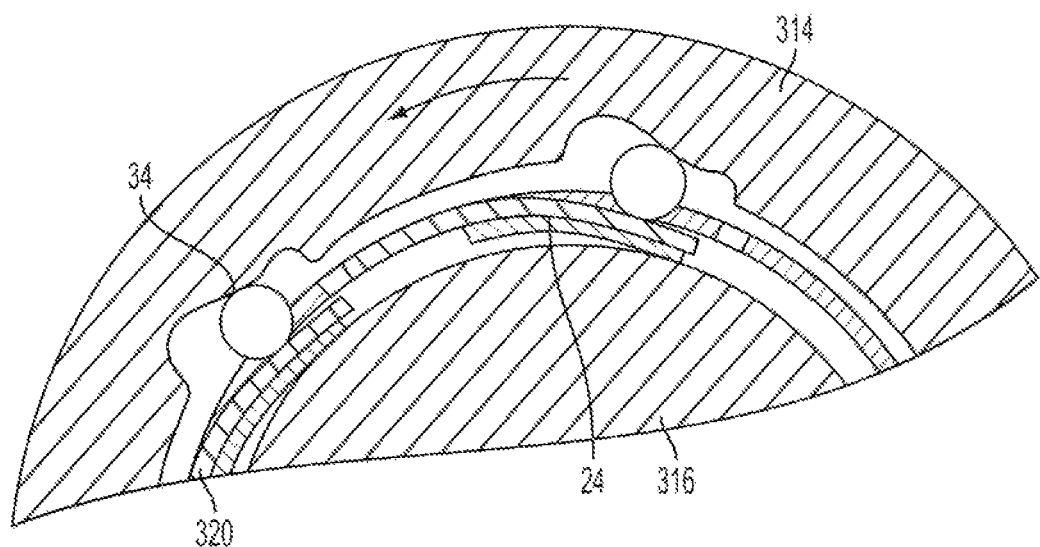
FIG. 8B is a view similar to FIG. 8A, except now the pin is located in a position where the driving member engages the driven member.

FIG. 8B is a view similar to FIG. 8A, except now the pin 334 is located in a position where the driving member 314 engages the driven member 316.

In all illustrated embodiments, some relative movement is permitted between the movable clutch portion and the driving member, to aid in the free movement of the pin 34 along the cam profile 38. More particularly, as the pin roles along the cam, it is desirable to have any resistance to rolling minimized. Since as the pin rolls along the cam, at one point, the pin engages the movable portion, having the movable portion move with the pin results in less resistance to the pin rolling along the cam. In less preferred embodiments, the pin or other cam follower can slide relative to the movable portion, with no relative movement provided between the clutch portion and the driving member.

Operation

More particularly, the clutch assembly operates as follows. As the driving member 14 begins to rotate, the radial force generated through the cam profile 38, the pin or cam follower 34, and the friction pad 64 creates a friction-based interface between the driving member 14 and the driven member 16. When the rotational force on the driving member 14 is stopped, the corresponding difference in rotation of the driving member 14 and the driven member 16 along with the spring forces in the clutch cylinder portion 24 cause the pin or cam follower 34 to follow the cam profile 38 towards its initial starting position. This motion of the pin 34 releases the radial force acting on the clutch cylinder pivotable portions 24, thus causing in the friction based joint between the driving member 14 and the driven member 16 to separate and allow for free rotation of the driven member 16 relative to the driving member 14.

In other words, when the driving member begins to move, the inertia of the pin resists movement with the driving member. But since some frictional contact is present between the pin and the driving member, the pin begins to roll relative to the driving member. This rolling motion is also aided by the bias on the roller from the movable portion bias means, and the inertia of the clutch cylinder. As the pin rolls along the cam on the driving member, the pin is in contact with the movable portion. When the pin engages the movable portion, the movable portion begins to move with the rolling pin. As the pin continues to roll up the cam, the movable portion is moved outwardly relative to the driving member by the pin. Eventually, the movable portion and the friction pad engage the driven member. The engagement with the driven member causes the pin to no longer roll along the cam, and the pin is trapped, in a solid stack, between the movable portion and the driving member. The pin then remains in this position, while the driving member is rotating, due to the frictional forces on the pin caused by the rotating driving member.

When the driving member is no longer rotating, the bias on the movable portion, as well as the change in inertia, begins to cause the pin to roll along the cam surface on the driving member towards the center of the driving member. As the pin begins to roll along the cam, the movable portion moves toward the center of the driving member, and the friction pad no longer engages the driven member. Further, as described above, the movable portion moves with the rolling pin as it begins to move.

The relative position of the pin on the cam surface on the driving member, and the clutch segment with friction pad, is best illustrated in FIGS. 8A and 8B, where in FIG. 8A, there is no engagement between the friction pad and the driven member, and in FIG. 8B, where there is engagement between the friction pad and the driven member.

Various other features of this disclosure are set forth in the following claims.

The invention claimed is:

1. A clutch assembly comprising a driving member that is cylindrical,
   a driven member that is cylindrical, coaxial with the driving member,
   a clutch cylinder between the driving member and the driven member and coaxial with the driving member and the driven member, with at least a portion of the clutch cylinder being radially movable between a driven member engaging position and a driven member disengaging position and spaced apart from the driven member when in a clutch assembly not engaged position,
   a first spring biasing the clutch cylinder portion towards the clutch cylinder central axis so that the clutch cylinder portion is spaced apart from the driven member in a clutch not engaged position,
   a slot in the driving member,
   a tab extending from the clutch cylinder and received in the slot, and
   a second spring located in the slot in the driving member between the driving member and the clutch cylinder for rotationally biasing the clutch cylinder relative to the driving member.

2. A clutch assembly according to claim 1 wherein the second spring is in the form of a U-shaped spring located in the slot in the driving member and compressible between the driving member and the clutch cylinder.

3. A clutch assembly according to claim 1 wherein the radially movable portion of the clutch cylinder is one of a plurality of spaced apart radially movable portions of the clutch cylinder.

4. A clutch assembly according to claim 3 wherein the spaced apart radially movable portions of the clutch cylinder are pivotable relative to a cylindrical base of the clutch cylinder.

5. A clutch assembly according to claim 4, and the first spring is a flexible attachment of the radially movable portions to the cylindrical base.

6. A clutch assembly according to claim 3 and further including a plurality of friction pads, each one being attached to a different one of the radially movable portions, and acting in response to radial movement of the radially movable portion to cause frictional engagement between the driving member and the driven member through the radially movable portion, so that the driving member rotates the driven member.

7. A clutch assembly according to claim 1 and further including a plurality of spaced apart indentations formed in a circumference of the driving member, and
  a plurality of cam followers, each one of which is received in one of the indentations between the driving member and the driven member, and responsive to rotation of the driving member.

8. A clutch assembly according to claim 7 wherein each of the indentations has a cam profile.

9. A clutch assembly according to claim 8 wherein each indentation is adjacent to a different one of the radially movable portions.

10. A clutch assembly according to claim 1 and further including a clutch assembly mounting axle extending along the central axis of the driving member.

11. A clutch assembly according to claim 10 and further including bearings rotatably mounting the axle inside the driving member and the driven member.

12. A clutch assembly according to claim 11 and further including bearings rotatably mounting the driving member inside the driven member.

13. A clutch assembly comprising a driving member that is cylindrical,
  a driven member that is cylindrical, coaxial with the driving member,
  a clutch cylinder between the driving member and the driven member and coaxial with the driving member and the driven member, with at least a portion of the clutch cylinder being radially movable between a driven member engaging position and a driven member disengaging position, where the portion of the clutch cylinder is one of a plurality of spaced apart radially movable portions of the clutch cylinder, and the spaced apart radially movable portions of the clutch cylinder are pivotable relative to a cylindrical base of the clutch cylinder,
  a slot in the driving member,
  a tab extending from the clutch cylinder and received in the slot,
  a flexible attachment of the radially movable portions to the cylindrical base with each radially movable portion being spaced apart from the driven member when in a clutch not engaged position, and
  a spring located in the slot in the driving member between the driving member and the clutch cylinder for rotationally biasing the clutch cylinder relative to the driving member in a clutch engagement direction.

14. A clutch assembly according to claim 13 and further including a plurality of friction pads, each one being attached to a different one of the Currently amended portions, and acting in response to radial movement of the radially movable portion to cause frictional engagement between the driving member and the driven member through the radially movable portion, so that the driving member rotates the driven member.

15. A clutch assembly according to claim 13 and further including a plurality of spaced apart indentations formed in a circumference of the driving member, and
  a plurality of cam followers, each one of which is received in one of the indentations between the driving member and the driven member, and responsive to rotation of the driving member.

16. A clutch assembly according to claim 15 wherein each of the indentations has a cam profile.

17. A clutch assembly according to claim 15 wherein each indentation is adjacent to a different one of the radially movable portions.

18. A clutch assembly according to claim 13 wherein the spring is in the form of a U-shaped spring located in the slot in the driving member and compressible between the driving member and the clutch cylinder.

* * * * *